(No Model.)

D. DOTSON.
FENDER OR GUARD FOR TRAMWAY CARS.

No. 592,241. Patented Oct. 26, 1897.

WITNESSES

INVENTOR
David Dotson
BY
Edgar Tate &c.
ATTORNEYS.

UNITED STATES PATENT OFFICE.

DAVID DOTSON, OF BROOKLYN, NEW YORK.

FENDER OR GUARD FOR TRAMWAY-CARS.

SPECIFICATION forming part of Letters Patent No. 592,241, dated October 26, 1897.

Application filed August 11, 1897. Serial No. 647,822. (No model.)

*To all whom it may concern:*

Be it known that I, DAVID DOTSON, a citizen of the United States, residing at Brooklyn, in the county of Kings and State of New York, have invented certain new and useful Improvements in Fenders or Guards for Tramway-Cars, of which the following is a full and complete specification, such as will enable those skilled in the art to which it appertains to make and use the same.

This invention relates to fenders or guards for tramway-cars; and the object thereof is to provide an improved device of this class which is simple in construction and operation and which is designed to prevent the serious and sometimes fatal results which frequently follow the striking of a person or object by a car when in motion.

The invention is fully disclosed in the following specification, of which the accompanying drawings form a part, in which—

Figure 1:
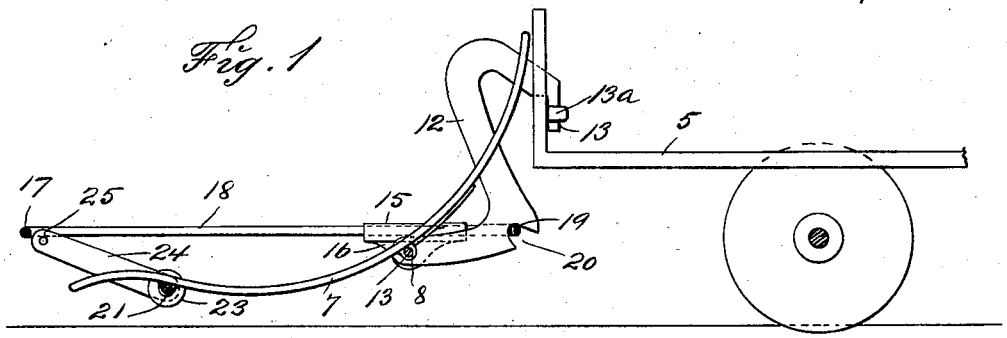
Figure 2:
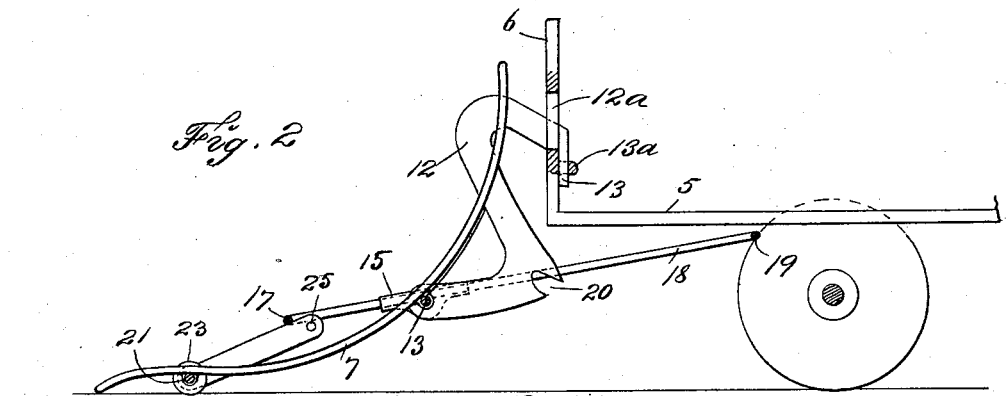

Figure 1 is a side view of a part of a car and showing my improved fender or guard connected therewith, part of the construction being shown in section; Fig. 2, a similar view showing the separate parts of the fender in a different position from that shown in Fig. 1, and Fig. 3 a bottom plan view of the device as shown in Fig. 1.

In the drawings forming part of this specification the separate parts of my improvement are designated by the same numerals of reference in each of the views, and in said drawings I have shown at 5 the platform at one end of a car and at 6 a part of the dashboard, and in the practice of my invention I provide a fender or guard which comprises a main frame 7, which is pivotally supported at 8 and which projects upwardly in front of the dashboard and downwardly and forwardly in front of the car, and the main frame is composed of side rods 9 and end rods 10 and a body portion 11 of wire mesh or similar material The main frame of the fender or guard is also supported by side arms 12, which are S-shaped in form, and the upper ends of said arms are projected backwardly and pass through slots 12ª in the dashboard and provided with downwardly-directed arms or hooks which are passed through keepers 13ª, and said arms are detachable from the dashboard and may be connected therewith in any desired manner, and the lower ends of the arms 12 are projected forwardly and connected by a transverse rod 13, which passes through keepers 14, secured to the bottom of the main frame of the fender or guard, and by means of this connection the main frame is pivotally connected with and free to turn on the rod 13.

Mounted on the ends of the rods 13 are tubular keepers 15, which are provided with depending bearings 16, through which said rod passes, and I also provide a supplemental fender or guard frame which consists of a front cross rod or bar 17 and side rods or bars 18, connected therewith, and these side rods or bars 18 are passed through the keepers 15 and are free to slide therein, and the rear ends thereof are provided with inwardly-directed arms 19, which are adapted to enter notches or recesses 20, formed in the rear portions of the lower elbows of the arms 12.

The main fender or guard frame is also provided near the forward end thereof with a cross-shaft 21, which is mounted in hangers 22, secured to the bottom of the side bars 9 of said main frame, and mounted on the outer ends of said shaft 21 are wheels or rollers 23, which are adapted, under certain conditions, to bear upon the ground, and the ends of said shaft 21 are also provided with pivoted bars or links 24, which are pivotally connected with inwardly-directed pins or projections 25, secured to or formed on the side bars 18 of the supplemental frame of the fender or guard.

The cross-rod or shaft 13 is provided with two springs 26, consisting of strong spring-wire, one end of which is coiled around said rod or shaft 13 and the other end curved upwardly and backwardly to the rear end of the main frame of the fender or guard, and these springs serve to force the rear end of the main frame of the fender or guard upwardly in the operation of the device, as hereinafter described, and to hold the parts of said fender or guard in the position shown in Fig. 2, and the operation will be readily understood from the foregoing description, when taken in connection with the accompanying drawings and the following statement thereof.

Figure 3:
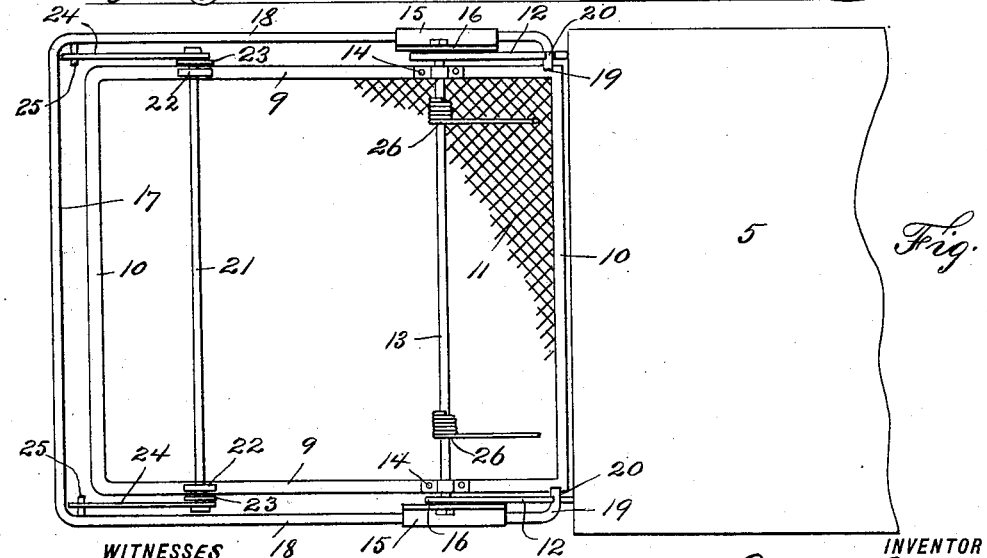

The normal position of the separate parts of the fender or guard when in position for use is that shown in Figs. 1 and 3, and in this position thereof the supplemental fender or guard frame is projected in front and above the forward end of the main fender or guard frame, and the arms 19 of the side bars 18 of the supplemental frame rest in the notches or recesses 20 in the lower elbows of the arms 12. If when the parts of the fender or guard are in this position a person, object, or thing should be struck by said fender or guard, the forward end of the supplemental frame would be thrown upwardly and backwardly, and the arms 19 of the supplemental frame would be disconnected from the notches or recesses 20, and said supplemental frame would be thrown backward into the position shown in Fig. 2, and the forward end of the main frame would at once be forced down into contact with the ground, and said parts would assume the position shown in Fig. 2, and the person, object, or thing struck would be received on the main frame of the fender or guard and be held thereon.

It will be understood that the parts of the fender or guard can be returned into the position shown in Fig. 1 by simply pulling the supplemental frame outwardly into the position shown in said figure, in which position the arms 19 thereof will engage with the notches or recesses 20 and the apparatus will again be in position for use.

My improved fender or guard is simple in construction and operation and is perfectly adapted to accomplish the result for which it is intended; and it will be apparent that changes in and modifications of the construction herein described may be made without departing from the spirit of my invention or sacrificing its advantages.

My improved fender or guard may also be detached from the car by simply detaching the arms 12, and the entire apparatus may be changed to the opposite end of the car whenever necessary, and this change may be made as often as necessary, and any suitable means for detachably connecting the arms 12 with the car may be employed.

Having fully described my invention, I claim as new and desire to secure by Letters Patent—

1. A fender or guard comprising supporting-arms detachably connected with the platform of a car, and provided at their lower ends with forwardly-directed extensions, a main fender or guard frame pivotally connected with the forward ends of said extensions, said main fender or guard frame being curved upwardly in front of the dashboard, and forwardly and downwardly, tubular keepers also pivotally connected with the forward ends of the extensions of said arms, a supplemental fender or guard frame consisting of a front bar, and side bars which pass backward through said tubular keepers, and which are provided with inwardly-directed extensions or arms which engage with notches or recesses formed in said supporting-arms, and the forward end of said supplemental frame being pivotally connected by means of links or bars with the forward end of the main frame, substantially as shown and described.

2. A fender or guard comprising supporting-arms detachably connected with the platform of a car, and provided at their lower ends with forwardly-directed extensions, a main fender or guard frame pivotally connected with the forward ends of said extensions, said main fender or guard frame being curved upwardly in front of the dashboard, and forwardly and downwardly, tubular keepers also pivotally connected with the forward ends of the extensions of said arms, a supplemental fender or guard consisting of a front bar, and side bars which pass backwardly through said tubular keepers, and which are provided with inwardly-directed extensions or arms which engage with notches or recesses formed in said supporting-arms, and the forward end of said supplemental frame being pivotally connected by means of links or bars with the forward end of the main frame, and said main frame being also provided near its forward end with wheels or rollers, substantially as shown and described.

3. A fender or guard comprising supporting-arms detachably connected with the platform of a car, and provided at their lower ends with forwardly-directed extensions, a main fender or guard frame pivotally connected with the forward ends of said extensions, said main fender or guard frame being curved upwardly in front of the dashboard, and forwardly and downwardly, tubular keepers also pivotally connected with the forward ends of the extensions of said arms, a supplemental fender or guard consisting of a front bar, and side bars which pass backwardly through said tubular keepers, and which are provided with inwardly-directed extensions or arms which engage with notches or recesses formed in said supporting-arms, and the forward end of said supplemental frame being pivotally connected by means of links or bars with the forward end of the main frame, and said main frame being also provided near its forward end with wheels or rollers, and the body thereof being composed of wire mesh or similar material, substantially as shown and described.

4. A fender or guard for tramway-cars consisting of supports which are adapted to be detachably connected with the platform of the car or the dashboard thereof, a main fender or guard frame pivotally connected with said supports and projecting upwardly, and downwardly and forwardly, a supplemental fender or guard frame pivotally connected with the forward end of the main fender or guard frame by means of links or bars, said supplemental fender or guard frame being provided with side bars which pass backwardly, tubular keepers pivotally connected with the supports and through which said side bars of the supplemental fender or guard frame pass, and the rear ends of said side bars of the supplemental fender or guard frame being adapted to engage with notches or recesses formed in said support, substantially as shown and described.

In testimony that I claim the foregoing as my invention I have signed my name, in presence of the subscribing witnesses, this 10th day of August, 1897.

DAVID DOTSON.

Witnesses:
C. GERST,
A. C. McLOUGHLIN.